(12) United States Patent
Scott, III

(10) Patent No.: US 12,331,473 B2
(45) Date of Patent: Jun. 17, 2025

(54) FIBER REINFORCED RESIN-BASED TEMPORARY ROAD BARRIER

(71) Applicant: Asynt Solutions, LLC, Dayton, OH (US)

(72) Inventor: Archie Scott, III, Dayton, OH (US)

(73) Assignee: Asynt Solutions, LLC, Dayton, OH (US)

( * ) Notice: Subject to any disclaimer, the term of this patent is extended or adjusted under 35 U.S.C. 154(b) by 188 days.

(21) Appl. No.: 17/941,458

(22) Filed: Sep. 9, 2022

(65) Prior Publication Data

US 2023/0083017 A1  Mar. 16, 2023

Related U.S. Application Data

(60) Provisional application No. 63/242,516, filed on Sep. 10, 2021.

(51) Int. Cl.
| | | |
|---|---|---|
| *E01F 15/08* | (2006.01) | |
| *B29C 70/00* | (2006.01) | |
| *B29C 70/06* | (2006.01) | |
| *B29C 70/28* | (2006.01) | |
| *B29L 31/00* | (2006.01) | |

(52) U.S. Cl.
CPC .......... *E01F 15/086* (2013.01); *B29C 70/003* (2021.05); *B29C 70/06* (2013.01); *B29C 70/28* (2013.01); *E01F 15/088* (2013.01); *B29K 2715/003* (2013.01); *B29L 2031/776* (2013.01)

(58) Field of Classification Search
CPC ......... E01F 15/02; E01F 15/08; E01F 15/081; E01F 15/086; E01F 15/088; B29C 70/003; B29C 70/06; B29C 70/28; B29C 70/026; B29C 70/443; B29C 70/546
See application file for complete search history.

(56) References Cited

U.S. PATENT DOCUMENTS 6,149,134 A * 11/2000 Bank .................. E01F 15/0453
404/9
6,413,009 B1 * 7/2002 Duckett ................ E01F 15/083
404/6
(Continued)

FOREIGN PATENT DOCUMENTS

| CN | 101694089 A | 4/2010 |
|---|---|---|
| CN | 103589084 A | 2/2014 |

(Continued)

OTHER PUBLICATIONS

Park, Tae Wook; International Search Report and Written Opinion of the International Searching Authority for PCT Application No. PCT/US2022/043051, filed Sep. 9, 2022; date of mailing Jan. 4, 2023; Korean Intellectual Property Office; Republic of Korea.

*Primary Examiner* — Brian E Glessner
*Assistant Examiner* — Adam G Barlow
(74) *Attorney, Agent, or Firm* — Thomas E. Lees, LLC

(57) ABSTRACT

A resin-based barrier comprises a body having a skin of fiber-reinforced resin. The body includes a top, a bottom, a front end, and a back end. A vertical shear web runs between the top and the bottom and is substantially perpendicular to the top and the bottom. Moreover, spaces between the vertical webbing and between the longitudinal webbing are filled with a high-density closed-cell foam. The barrier may be used as a temporary traffic barrier during road construction.

1 Claim, 7 Drawing Sheets

(56) References Cited

U.S. PATENT DOCUMENTS

| | | | | |
|---|---|---|---|---|
| 6,733,002 B1* | 5/2004 | de Maussion | ...... | E01F 15/0453 404/6 |
| 7,640,864 B2 | 1/2010 | Yamazaki et al. | | |
| 8,393,822 B2* | 3/2013 | Hotchkin | ...... | E01F 15/085 404/6 |
| 9,133,591 B2* | 9/2015 | Maus | ...... | E01F 15/143 |
| 10,544,555 B1* | 1/2020 | Lim | ...... | E01F 15/08 |
| 10,683,625 B2* | 6/2020 | Kulp | ...... | E01F 13/02 |
| 10,844,560 B2* | 11/2020 | Ramaekers | ...... | E01F 15/08 |
| 11,781,274 B2* | 10/2023 | Ramaekers | ...... | E01F 15/10 404/6 |
| 12,049,736 B2* | 7/2024 | Impero | ...... | F21V 23/0442 |
| 2003/0081998 A1* | 5/2003 | Yodock, III | ...... | E01F 15/083 404/6 |
| 2005/0158119 A1* | 7/2005 | Yodock, III | ...... | E01F 15/0453 404/6 |
| 2005/0254892 A1* | 11/2005 | Yodock, III | ...... | E01F 15/088 404/6 |
| 2010/0061800 A1* | 3/2010 | Riddell | ...... | E01F 15/088 404/6 |
| 2010/0111602 A1* | 5/2010 | Yodock, III | ...... | E01F 15/083 404/6 |
| 2010/0266833 A1 | 10/2010 | Day et al. | | |
| 2014/0050524 A1* | 2/2014 | Kulkarni | ...... | E01F 15/04 404/6 |
| 2015/0132055 A1* | 5/2015 | Tufte | ...... | E01F 15/088 404/6 |
| 2017/0175349 A1* | 6/2017 | Davis | ...... | B29C 43/18 |
| 2023/0035769 A1* | 2/2023 | Seguin | ...... | E01F 15/088 |
| 2024/0026620 A1* | 1/2024 | Seguin | ...... | E01F 15/083 |
| 2024/0110348 A1* | 4/2024 | Seguin | ...... | E01F 15/006 |

FOREIGN PATENT DOCUMENTS

| | | |
|---|---|---|
| CN | 103589085 A | 2/2014 |
| CN | 105908661 A | 8/2016 |
| CN | 108586887 A | 9/2018 |
| CN | 209144722 U | 7/2019 |
| WO | 2007127205 A4 | 11/2007 |

* cited by examiner

FIBER REINFORCED RESIN-BASED TEMPORARY ROAD BARRIER

CROSS REFERENCE TO RELATED APPLICATIONS

This application claims the benefit of U.S. Provisional Patent Application Ser. No. 63/242,516, filed Sep. 10, 2021, entitled RESIN-BASED FIBERGLASS TEMPORARY ROAD BARRIER, the disclosure of which is hereby incorporated herein by reference.

BACKGROUND

Various aspects of the present invention relate generally to road barriers used to separate traffic during road reconstruction and more specifically to a resin-based barrier used to separate traffic.

During highway construction and repair on existing highways, it is desirable to maintain traffic on those highways. However, with highway construction, traffic lanes may be narrowed or rerouted on a different part of the highway. As such, temporary traffic barriers (sometimes called a Jersey barrier) are used to separate traffic in different directions or even to separate lanes going the same direction. These temporary traffic barriers help minimize vehicle damage in cases of incidental contact while still preventing vehicle crossovers that could result in a head-on collision. Further, the temporary traffic barriers act to protect people and equipment performing work on the highway.

BRIEF SUMMARY

According to aspects of the present disclosure, a resin-based barrier comprises a body having a skin of fiber-reinforced resin. The body includes a top, a bottom, a front end, and a back end. A vertical shear web runs between the top and the bottom and is substantially perpendicular to the top and the bottom. Moreover, spaces between the vertical webbing and between the longitudinal webbing are filled with a high-density closed-cell foam.

According to further aspects of the present disclosure, a resin-based barrier comprises a body having a skin of fiber-reinforced resin. The body includes a top, a bottom, a front end, and a back end. A vertical shear web runs between the top and the bottom and is substantially perpendicular to the top and the bottom. Further, a longitudinal shear web runs between the front end and the back end and is substantially parallel to the top and the bottom. Moreover, spaces between the vertical webbing and between the longitudinal webbing are filled with a high-density closed-cell foam. The top includes first and second lift points that allow a crane or other lifting device to be coupled to the barrier. The bottom runs substantially parallel to the top and includes a self-correcting ledge and anchor holes that allow the barrier to be anchored to a substrate (e.g., a highway under repair). The front end includes a recess that houses a coupler, a hollow for receiving a splicer of another barrier, and a specialized geometry with tapers. The back end (opposite the front end) includes a hollow that houses a splicer, a coupler complementary to a coupler on a front end of another barrier such that the couplers engage when the other barrier is lowered next to the resin-based barrier, and a complementary specialized geometry that is complementary to the specialized geometry of the front end. The body further includes drainage holes and a slot for a handle of the splicer to couple to the splicer such that a user may operate the splicer. Also, the body around the couplers and the anchor holes is filled with ultra-high-density closed-cell foam.

According to still further aspects of the present disclosure, a process for creating a resin-based fiber barrier comprises lining a tooling shaped approximately like a desired shape of the barrier with fiber sheets to create a base for an outer skin of the barrier, leaving enough fiber outside the tooling to create a bottom of the barrier at a later time. Then, the following is repeated until the tooling is filled: fiber-wrapped closed-cell foam inserts are inserted into the tooling on top of the layers; fiber sheets are placed between adjacent foam inserts to create vertical shear webs; and more layers of fiber sheets are layered onto the foam inserts once the foam inserts to create longitudinal shear webs. Once the tooling is filled, the fiber that was left outside the tooling is wrapped to create the bottom of the barrier. Then resin is infused into the fiber and cured.

DETAILED DESCRIPTION

A resin-based (e.g., vinyl, polyester, etc.) barrier is lighter than current concrete-based barriers yet still strong enough to function as a barrier. The barrier has a body with internal shear webbing that helps prevent the barrier from deforming when a vehicle hits the barrier. A fiber-reinforced vinyl resin is a skin (i.e., outer shell) of the barrier and provides a hardened exterior. In many embodiments, the shear webbing runs horizontally, coupling to a front and back of the body, but not touching to a top or a bottom of the body (i.e., horizontally lengthwise). In various embodiments, the internal shear webbing run vertically between the top and the bottom of the body, but not touching the front or back of the body. The body is also filled with a high-density, closed-cell foam. Further, the barriers include coupling mechanisms that allow the vinyl resin-based barriers to be assembled with one another easier. The fibers can be any type of suitable fiber (e.g., aramid fiber, carbon fiber, hemp fiber, glass, etc.).

The benefits of the vinyl resin-based barriers described herein include that they are more corrosion resistant and lighter than traditional barriers of concrete, so they are easier to transport and assemble. They absorb more energy during impact than concrete barriers, steel barriers, or plastic barriers, improving a driver's ability to maintain control of the vehicle during incidental contact. Further, they are sturdier than traditional hollow barriers filled with water, so they will deform less than the hollow barriers. Moreover, coupling mechanisms integrated into the barriers allow for the vinyl resin-based barriers described herein to be assembled with other barriers more easily than traditional barriers.

Overview of Vinyl Resin Based Barrier

Figure 1:
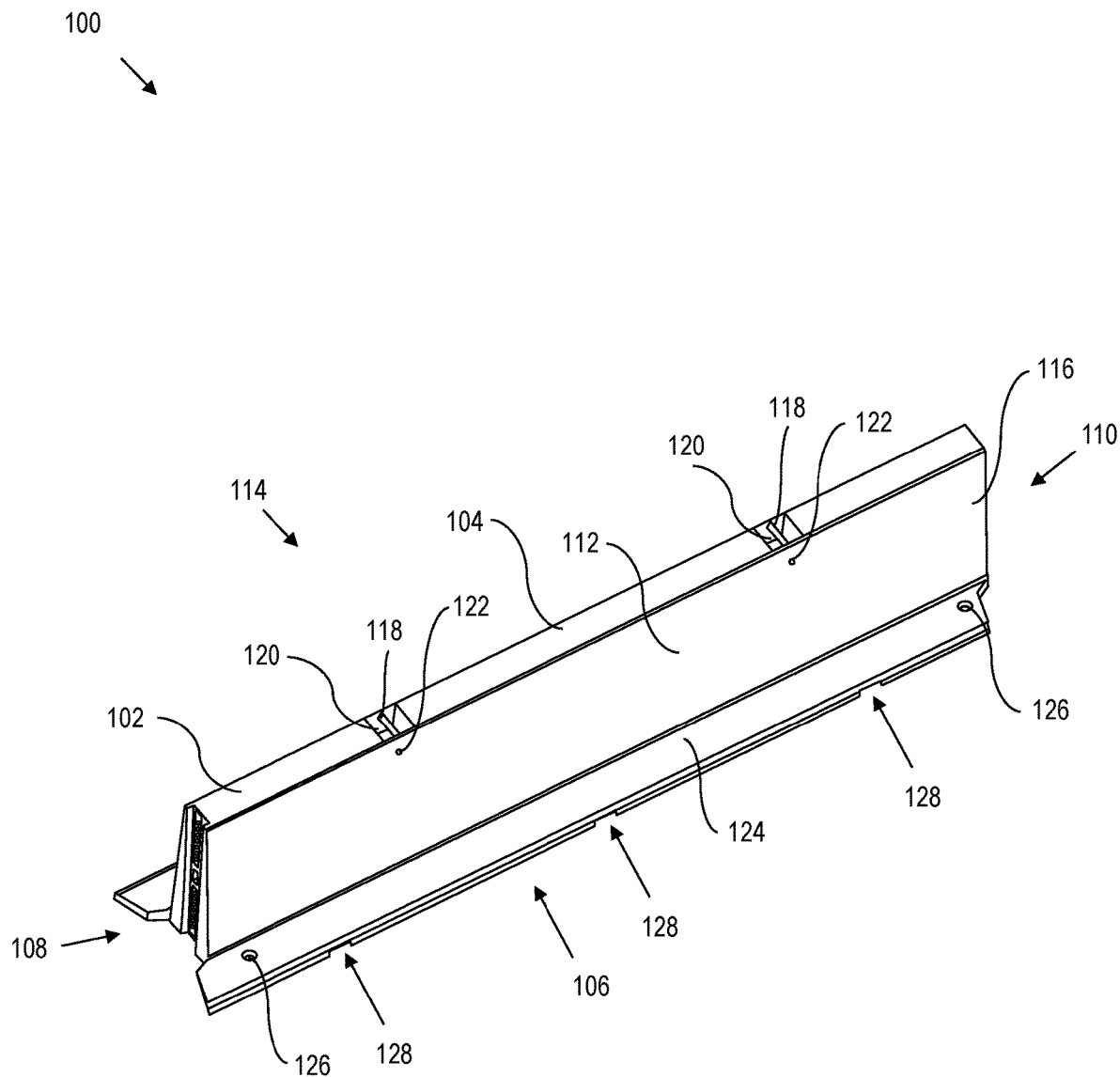
FIG. 1 is an illustration showing a fiber-reinforced resin-based temporary barrier, according to various aspects of the present disclosure.

Turning now to the figures and in particular to FIG. 1, a vinyl resin-based barrier 100 is shown. The barrier 100 includes a body 102 that has a top 104, a bottom 106 (generally parallel to the top 104), a front 108, and a back 110 opposite the front 108, along with two sides 112, 114. As will be discussed herein, the body 102 further includes a fiber-reinforced resin-based skin 116. In numerous embodiments, the body 102 includes lift-points 118 including wells 120 to allow straps or other connecting mechanisms from a crane (or other lifting device), so the crane can lift the barrier 100 for placement on a road. As the barriers 100 are meant for outdoor use, there is a possibility that rainwater may fill the wells 120. As such, drainage holes 122 are present for the wells 120 to allow any fluid to escape the wells 120.

The body 102 further includes a self-correcting ledge 124 (a self-correcting ledge). For example, if during use a vehicle impacts the barrier 100, a tire of the vehicle may roll onto the ledge 124 just before and during the impact. The weight of the vehicle is used as a counter to momentum of the vehicle helping the barrier 100 remain upright, not displace laterally, and not roll about the length (i.e., longitudinal axis) of the barrier. Further, to help the barrier 100 remain in place if a vehicle hits the barrier 100, in some embodiments, anchor holes 126 in the ledge 124 allow for an anchor (not shown) to couple the barrier 100 directly to the road or other surface. Moreover, in some embodiments, the bottom 106 of the barrier 100 includes channels 128 that are spaced so a forklift (or other industrial vehicle) can lift the barrier 100. The channels also have a benefit of allowing rainwater and other liquids to pass under the barrier 100 while the barrier is in use, so the barrier does not act like a dam.

The barrier 100 can range any length, but common lengths are from two feet (approx. 0.6 meters) to forty-eight feet (approx. 14.6 meters) in length front 108 to back 110. Moreover, the bottom of the barrier 100 may be any desired width; however, in order to not encroach on a worksite, the bottom should not be more than two feet (approx. 0.6 meters) and is ideally twenty inches. In some embodiments, the top includes holes to accommodate structures that help shield drivers of vehicles from headlights of vehicles traveling in an opposite direction. Moreover, the barrier 100 is not required to be straight. Instead, there may be a bend at any desired angle (e.g., 90 degrees from straight, 45 degrees from straight, etc.) along the length of the barrier. Further, the ends of the barrier may be such that when another barrier is coupled, the coupling angle of the two barriers coupled together is different than 180 degrees.

Internal Structure of Vinyl Resin-Based Barrier

Figure 2:
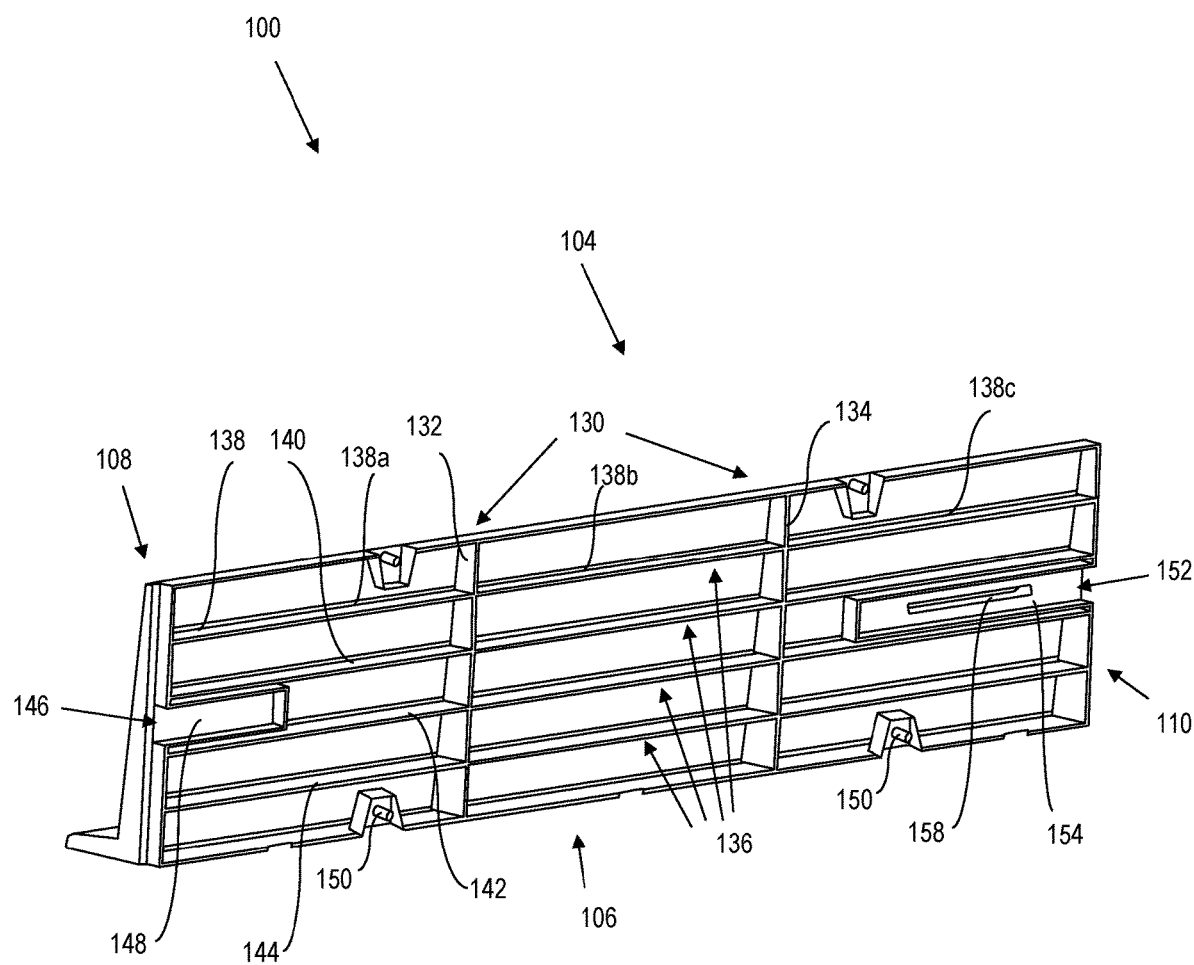
FIG. 2 is an illustration showing an interior of an embodiment of the fiber-reinforced resin-based temporary barrier of FIG. 1, according to various aspects of the present disclosure.

Turning now to FIG. 2, a cross section of the barrier 100 of FIG. 1 is shown. Again, the barrier includes a top 104, a bottom 106, a front, 108 and a back 110. Further, the barrier 100 includes vertical shear webbing 130 that runs from the top 104 to the bottom 106. The vertical shear webbing 130 is made of a similar structure as the skin 116 of the body 102. For example, if a low viscosity, unpromoted epoxy vinyl ester resin with fiber reinforcement (e.g., Derakane, which is a registered trademark owned by Ineos Composites IP, LLC, a Delaware corporation; Aropol 7334, etc.) is used to create the outer skin 116, then the same resin or a similar one is used to make the vertical shear webbing 130. Other suitable fibers can be used with various suitable resins (e.g., aramid fiber, carbon fiber, hemp fiber, glass, etc.). Individual webs 132, 134 of the vertical shear webbing 130 should be placed at a maximum of about four feet (approx. 1.2 meters), which helps to reduce deflection within the barrier 100 when the barrier 100 is struck by an object like a vehicle. Thus, the vertical shear webbing 130 helps reinforce the barrier 100. As shown in FIG. 2, there are two vertical shear webs 132, 134; however, any number of vertical shear webs spaced at different lengths (e.g., other than about four feet) could be used in other embodiments.

Further, the numerous embodiments of the barrier 100 include longitudinal shear webbing 136 that runs between the front 108 and the back 110 of the body. Similar to the vertical shear webbing 130, the longitudinal shear webbing 136 can be made from the same or similar material as the skin 116. There can be any spacing between longitudinal webs, and in many embodiments, there is about six-and-a-quarter inches (approx. 16 centimeters) between the longitudinal shear webs. As shown in FIG. 2, there are four longitudinal shear webs 138, 140, 142, 144, each with three sections 138a-c (referenced only on the top longitudinal shear web 138 only for simplicity). However, any number of longitudinal shear webs may be used, but the number of sections will be dependent on the number of vertical shear webs.

Figure 7:
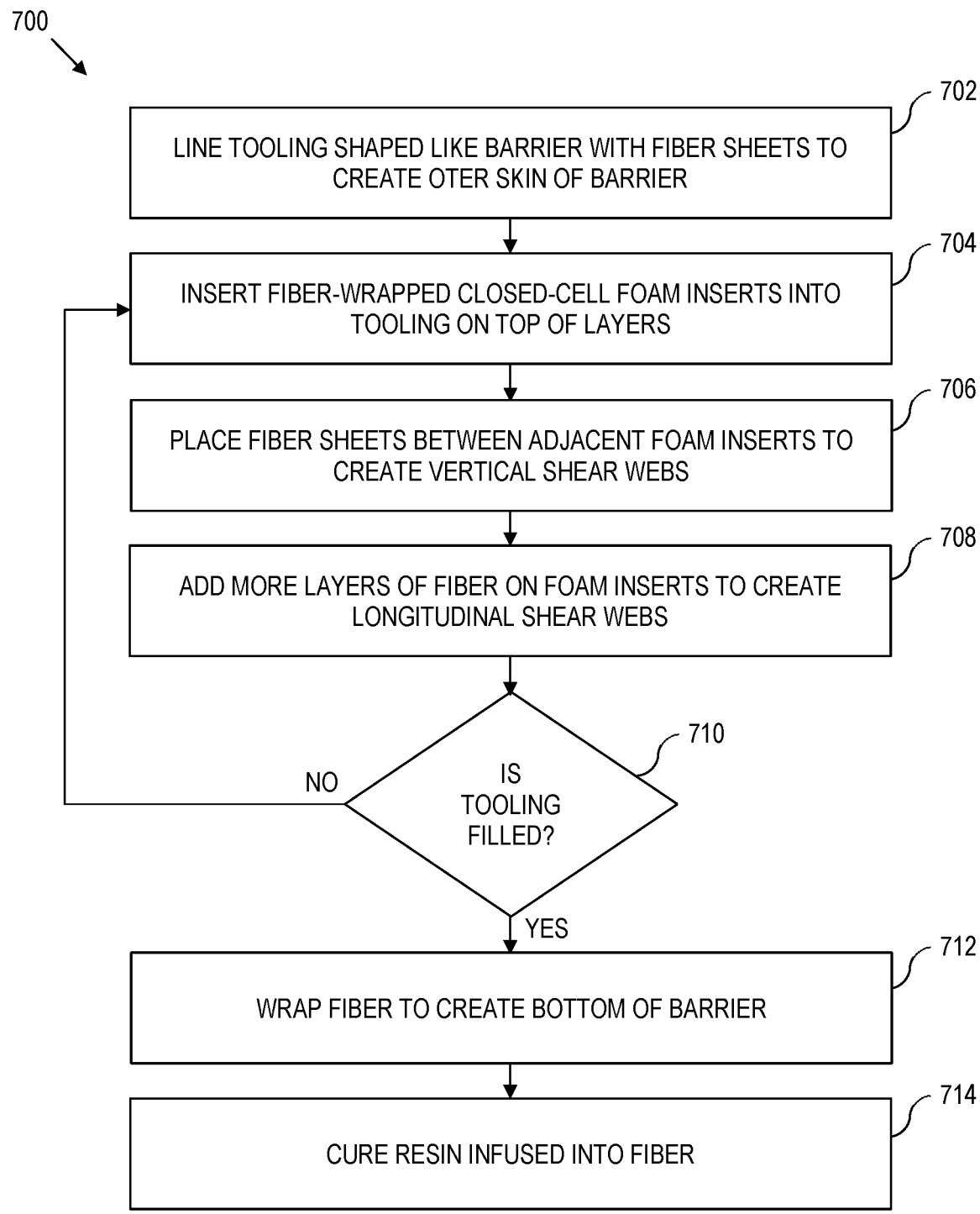
FIG. 7 is a flow chart illustrating a process for creating embodiments of the barriers described herein, according to various aspects of the present disclosure.

Many embodiments of the barrier include both vertical shear webbing 130 and longitudinal shear webbing 132, as shown in FIG. 2. Further, a process for creating the shear webbing is discussed in further detail below in reference to FIG. 7. A closed-cell foam in incorporated in spaces between the webs 132, 134, 138, 140, 142, 144. Thus, while there is webbing 130, 136, the barrier 100 is not empty. In areas where hardware devices (i.e., non-resin/non-fiberglass devices—see below) are coupled to the barrier, a denser foam is used to provide more resistance against moisture penetration, corrosion, and freeze-thaw damage to the barrier 100 to allow the hardware devices to find purchase in the barrier 100.

With further reference to FIG. 2, the front 108 of the barrier 100 includes an aperture 146 that leads to a hollow 148. The hollow 148 is spaced large enough to receive a splicer from another barrier. In various embodiments, the bottom 106 of the barrier 106 also includes lift points 150, so the barrier 100 can be lifted even if the barrier is upside down (e.g., during creation to lift the barrier out of tooling used to create the barrier, as discussed below). The back 110 also includes an aperture 152 that leads to a hollow 154 that houses a splicer (156 see FIG. 3) in many embodiments.

The splicer is a bar that can extend and retract from the back hollow 154. When two barriers 100 are aligned front-to-back, extending the splicer out of the aperture 152 of the back of one of the barriers and into the aperture 146 of the front of the other barrier 100 couples the two barriers 100 together. A slot 158 on a side of the barrier 100 allows for a user to attach a handle (see below) to the splicer 156 (which is internal to the barrier 100—inside the hollow 154 of the back 110). For example, the splicer may include a threaded coupler and the handle would include a complementary threaded coupler. Thus, the user can screw the handle onto splicer 156 to extend or retract the splicer 156 in relation to the barrier 100. In various embodiments, the back hollow 154 includes devices to keep the splicer extended, retracted, or both once the splicer is moved by the user into a desired position. The splicer 156 helps reduce deflections in a series of barriers if a vehicle collides with the series of barriers.

Coupling a Series of Barriers

Figure 3:
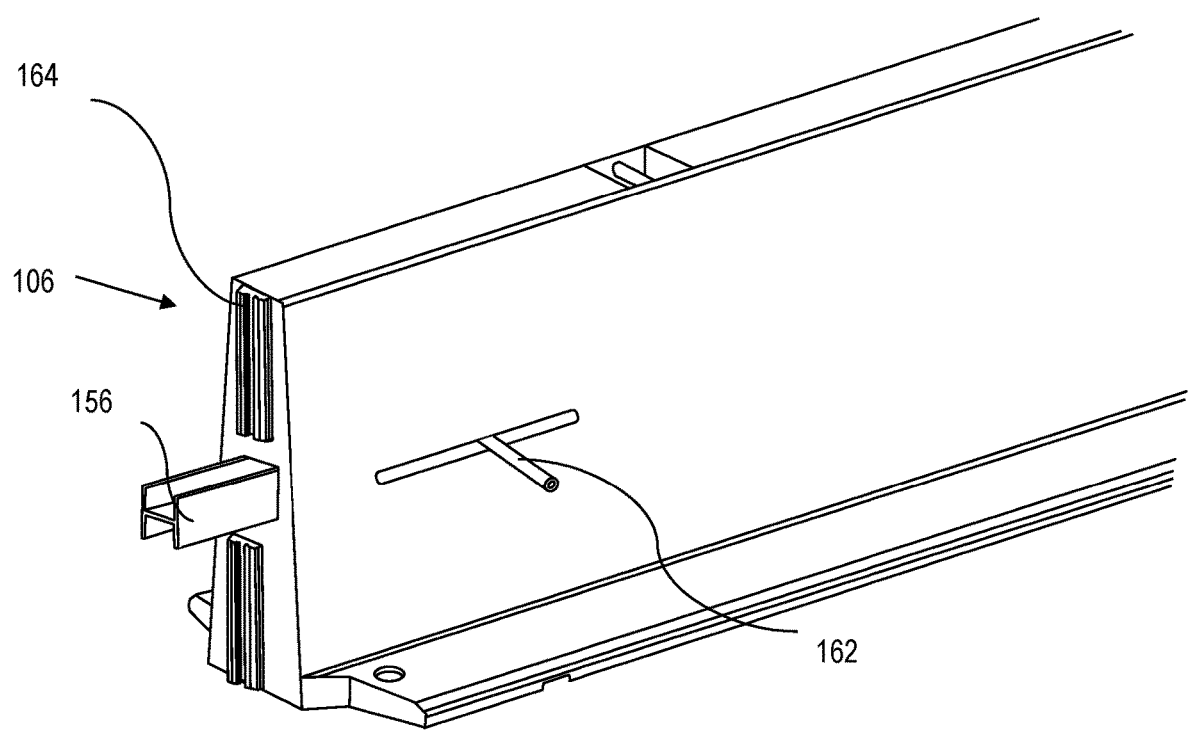
FIG. 3 is an illustration showing a back end of an embodiment of the fiber-reinforced resin-based temporary barrier of FIG. 1, according to various aspects of the present disclosure.

Turning now to FIG. 3, an external view of the back 110 of the barrier 100 is shown. The splicer 156 is shown in a partially extended state, where the handle 162 is coupled to the splicer 156. Further, the barrier 100 includes a vertical coupler 164 on the back 110.

Figure 4:
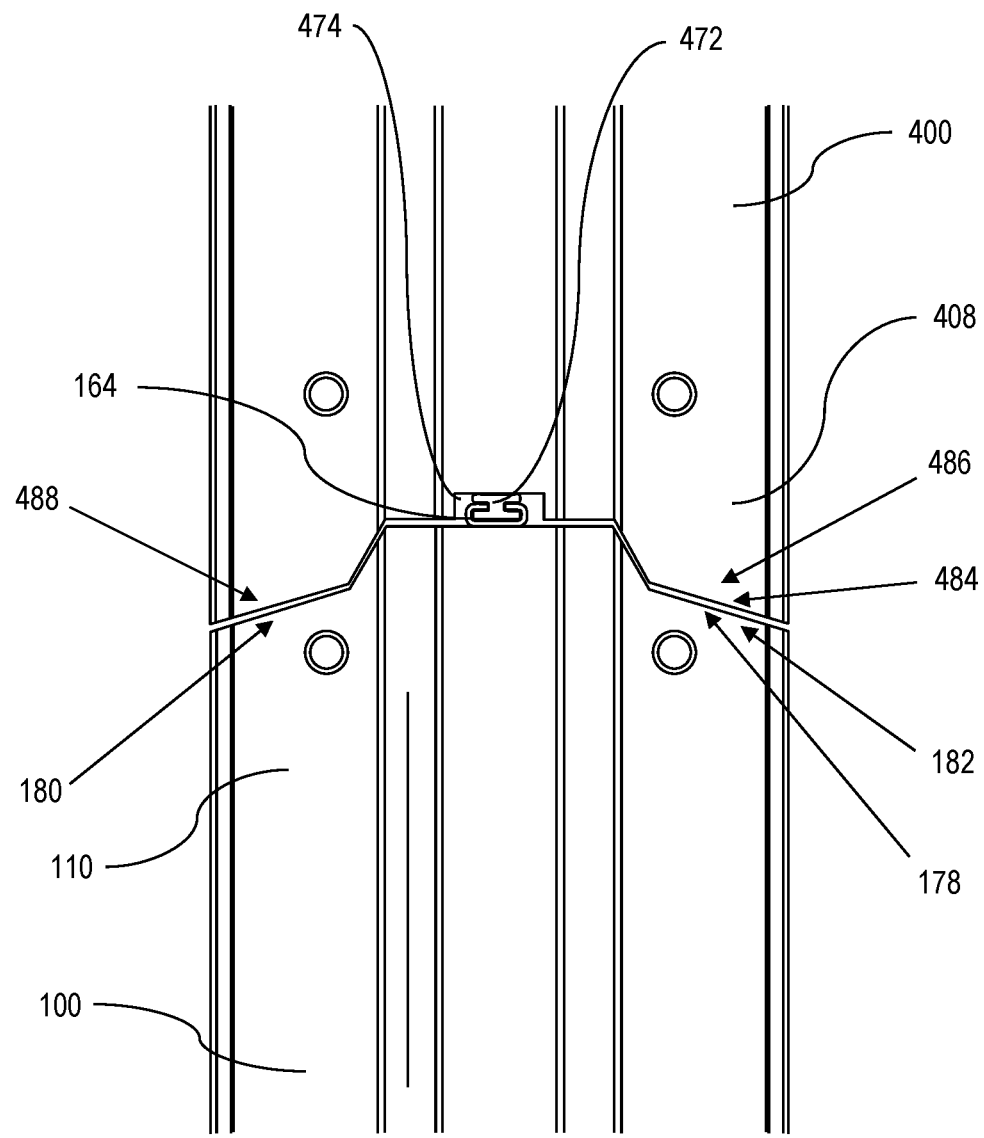
FIG. 4 is an illustration showing a top of two barriers to illustrate coupling the barriers serially, according to various aspects of the present disclosure.

FIG. 4 is a top view of two barriers 100, 400 coupled together to make a series of barriers. While only two barriers 100, 400 are shown in FIG. 4, any number of barriers can be coupled together using the hardware described herein. Further, to help differentiate between the two barriers 100, 400, a first barrier is denoted by 100, and a second barrier is denoted by 400. The components of the two barriers 100, 400 will use the same last two digits (as in FIGS. 1-3), while the hundreds digit will denote which barrier the component is associated with.

As discussed in FIG. 3, the back 110 of the first barrier 100 includes a vertical coupler 164. Further, the front 408 of the second barrier 400 includes a complementary vertical coupler 472 in a recess 474. Thus, to couple the barriers 100, 400, the first barrier 100 is lowered proximate to the second barrier 400 such that the vertical coupler 164 of the first barrier 100 slides to engage with the complementary vertical coupler 472 of the second barrier 400. As shown in FIG. 4, the back 110 of the first barrier 100 includes a C-shaped vertical coupler 164 that goes around a portion of an H-shaped complementary vertical coupler 472 on the front 408 of the second barrier 400. However, in some embodiments, the back 110 of the first barrier 100 the vertical 164 coupler is H-shaped, and the complementary vertical coupler 472 is C-shaped. In numerous embodiments, the couplers 164 and 472 are other complementary shapes. Moreover, FIG. 4 illustrates the recess 474 on the front 408, but in various embodiments, the recess is on the back 110 of the first barrier 100 instead of the front 408 of the second barrier 400.

In the discussion above, the first barrier is lowered to engage the vertical couplers, but it is also possible that the second barrier is lowered instead. Further, the barriers can be lowered by a crane and guided by a user for alignment of the vertical couplers. In some embodiments, the reduced weight of the barriers can be lowered without use of a crane (e.g., using a forklift, by people for shorter sections, etc.). For example, the fiber-reinforced resin-based barriers described herein weigh about 40-60 pounds per linear foot, while a comparable concrete barrier weighs about 400 pounds per linear foot.

In many embodiments, once the vertical coupler 164 and the complementary vertical coupler 472 are aligned and coupled, the splicer (156, FIG. 3) is transitioned from the retracted state to the extended state. The handle can be coupled to the splicer at any time before the splicer is moved. For example, the handle can be coupled to the splicer before or after the first barrier 100 is lowered. Moreover, the handle is removable, so after the splicer is placed in the extended state, the handle can be decoupled for subsequent use to extend/retract the splicer of another barrier. Further, the handle should be removed so the handle does not stick out in a roadway on which the barrier rests. In numerous embodiments, instead of the handle being removable, the handle is stowable by collapsing, folding, rotating, or combinations thereof to be in-line with the barrier such that the handle does not need to be removed but remains out of the way of traffic when the barrier is in use. In various embodiments do not include the splicer, which reduces overall weight of the barrier.

In several embodiments, the back 110 includes a specialized geometry 178 instead of a flat geometry. Thus, instead of a flat back 110, the back 100 includes tapers 180, 182 that extend at an angle that is not perpendicular to a length of the barrier 100 as looked at from the top (as shown in FIG. 4). Moreover, the front 408 of the second barrier 400 includes a complementary specialized geometry 184 such that instead of tapers, there are corresponding wings 186, 188. This specialized geometry 178 and corresponding specialized geometry 184 provide an improved resistance to bending that may occur at a junction 190 of the first barrier 100 and the second barrier. Further, the specialized geometry 178 and corresponding specialized geometry 184 reduce damage to the barrier caused by other barriers during impact. In numerous embodiments, the same specialized geometry is located on both a front and back of a first barrier (i.e., a type-A barrier), and the same corresponding geometry is located on both a front and back of a second barrier (a type-B barrier). In such embodiments, type-A barriers alternate with type-B barriers to create a series of barriers, and the barriers will be orientated properly without having to spin the barriers to have the correct geometry of one barrier align with the geometry of a subsequent barrier.

While not shown in FIG. 4, the front end, the back end, or both may include bumpers to allow more flexibility and to help reduce damage to the barrier caused by other barriers during an impact.

Another Embodiment of Fiber-Reinforced Resin-Based Polymer Barrier

Figure 5:
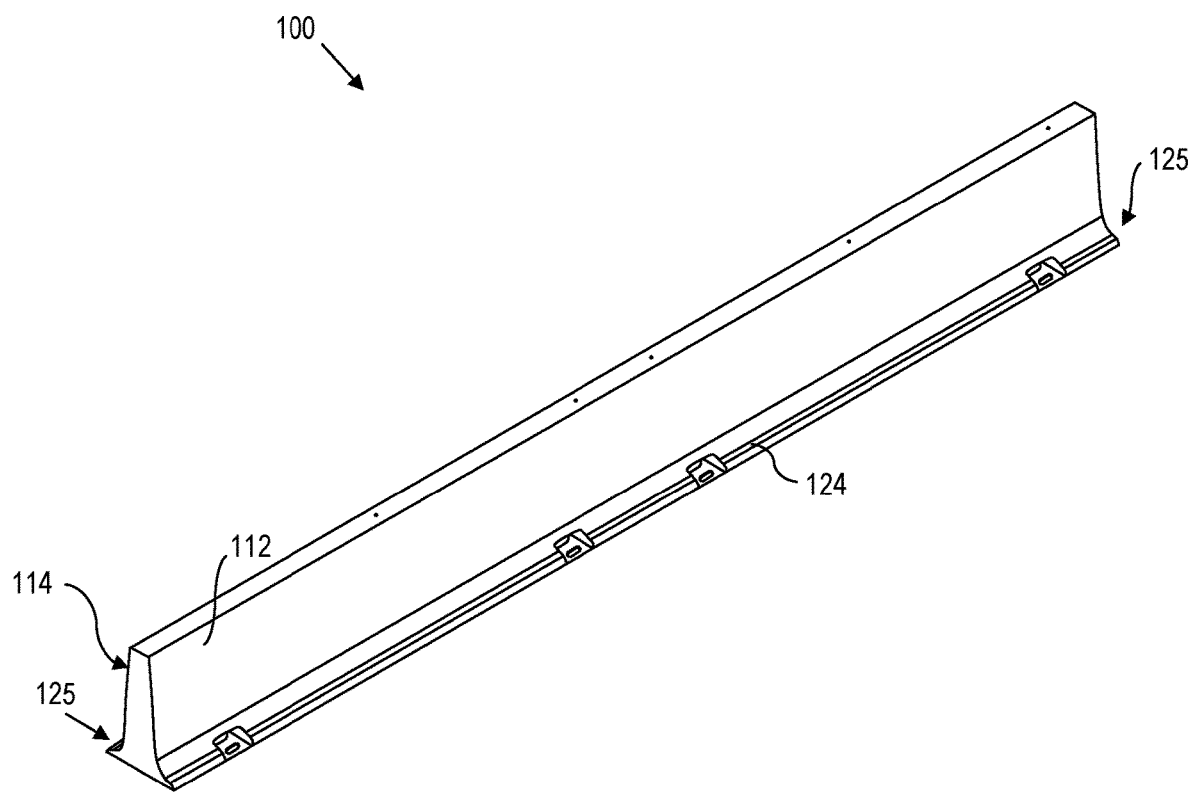
FIG. 5 is an illustration showing another embodiment of a fiber-reinforced resin-based temporary barrier, according to various aspects of the present disclosure.
Figure 6:
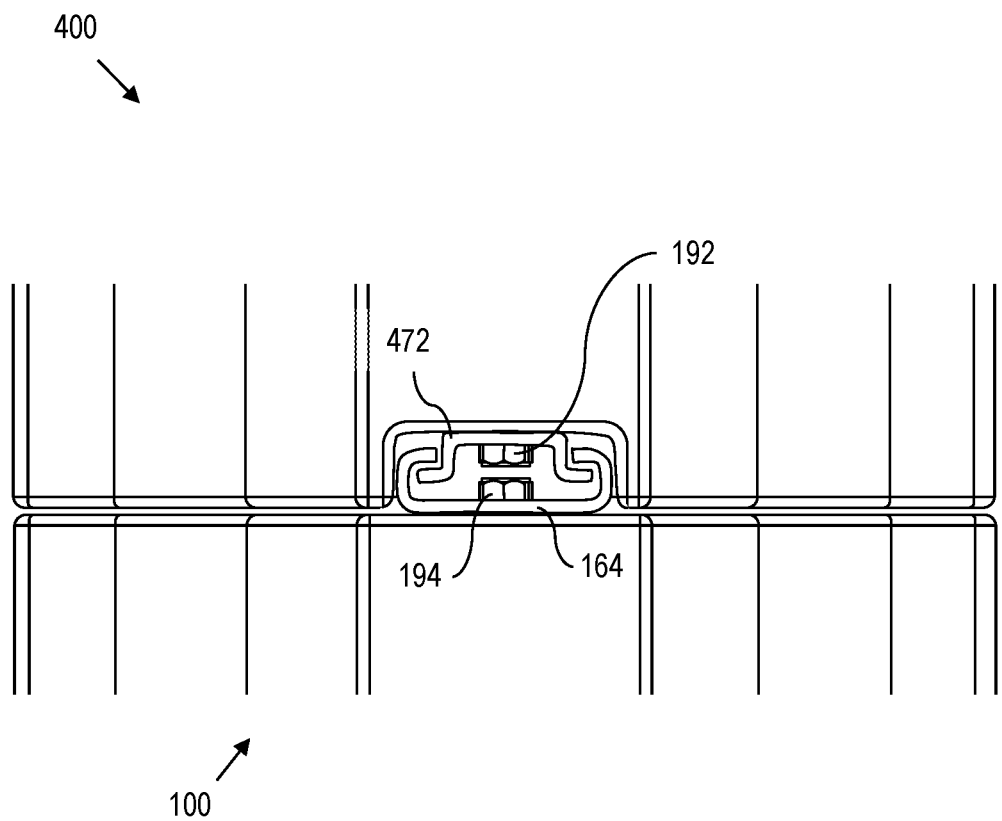
FIG. 6 is an illustration showing another embodiment of a top of two barriers to illustrate coupling the barriers serially, according to various aspects of the present disclosure.

FIG. 5 illustrates another embodiment of the barrier 100, where instead of an abrupt transition between the sidewall 112, 114 and the ledge 124 (as in FIG. 1), there is a smooth, curved transition 125 between the sidewalls 112, 114 and the ledge 124. Further, the lift points and splicer are not shown in FIG. 5, but as discussed herein, may be added to this embodiment or any other embodiment. Moreover, as shown in FIG. 6, an end geometry is flat as opposed to the specialized geometry discussed above. Moreover, in FIG. 6, the C-shaped coupler 164 is present similar to FIG. 4, but the complementary coupler 472 takes a different shape. Thus, instead of an "H" or "I", the complementary coupler 472 has flanges on both sides. This type of coupler allows for recessed spaces for fastener heads 192, 194 to couple the C-shaped coupler 164 and the complementary coupler 472 to corresponding barriers 100, 400 where the fastener heads do not interfere with each other.

The features of the embodiments described herein can be mixed to form other embodiments. For example, the curved base of the embodiment of FIG. 5 can be used with the specialized geometry described in reference to FIG. 4.

Creating a Resin-Based Fiber Reinforced Polymer Barrier

A process 700 for creating embodiments of the resin-based fiber reinforced polymer barrier is disclosed. At 702, an open-ended tooling (e.g., a mold) shaped approximately like a desired shape of the barrier is lined with fiber to create a base for an outer skin of the barrier. Other suitable fibers can be used with various suitable resins (e.g., aramid fiber, carbon fiber, hemp fiber, etc.). In some embodiments of the process 600, the tooling is open-ended at a top of the tooling, which is what would be a bottom of the barrier. Thus, as the fiber layers are added to the bottom of the tooling, the barrier is being built top-first. In other words, the tooling is shaped as an inverted (i.e., upside-down) barrier. In embodiments of the barrier with steel (or other material) lift points, the lift point embeds (e.g., steel knockouts) are added. Other hardware embeds (e.g., couplers, places where other things are to be coupled to the barrier, etc.) are also added as needed for various embodiments of the barriers. Further, the tooling should have resin-infusion points to allow resin to be distributed into the tooling as desired during curing. Along with lining the tooling, "extra" fiber is allowed to remain outside the tooling at this point, so there is enough fiber to close off the barrier once the tooling is filled, as discussed below.

At 704, closed-cell foam (e.g., two-pound foam) inserts that approximate a size of spaces between shear webbing that are wrapped in fiber are inserted into the tooling on top of the skin layers. In places where a hole may need to be drilled in the barrier for various reasons, a higher-density foam (e.g., ultra-high density foam similar to Coosa board) may be used. Coosa is a registered trademark owned by Coosa Composites Holdings, LLC. This ultra-high density foam helps keep water from penetrating the barrier and provides a good structure for couplers to find purchase. In some embodiments, the embeds (discussed above) are added before the closed-cell foam inserts are inserted into the tooling.

At 706, fiber sheets are placed between adjacent foam inserts to create vertical shear webs, as discussed above. At 708, more layers of fiber are added to create horizontal webs, as discussed herein. At 710, steps 704-708 are repeated until an interior of the barrier is created, adding embeds and creating hollows as desired for any specific embodiment of the barrier.

At 712, the "extra" fiber is wrapped to complete the to-be skin on the bottom of the barrier.

At 714, a vacuum is pulled. For example, the tooling (including the to-be barrier) is placed in a vacuum bag, and a vacuum is drawn. While under the vacuum, vinyl-ester resin and a catalyst is added to infuse the barrier through the resin-infusion points. For example, a vacuum is pulled to achieve approximately one atmosphere for a time based on the type of resin infused during this process and a size/geometry of the barrier to be created (e.g., twenty minutes for a twelve-foot standard barrier). In various embodiments, the tooling also includes a heating element to help promote an exothermic process to cure the resin efficiently. The vacuum pressure and heat time varies on the resin type, amount of fiber layers, ambient weather, and other factors. Once the resin is cured, the barrier is removed from the tooling, deflashed, equipped with hardware (e.g., a splicer), drilled for required holes (e.g., drainage holes, anchor holes, etc.), primed and painted (e.g., white or another easily visible color).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A resin-based barrier comprising:
   a body having a skin of fiber-reinforced resin, the body including:
      a top including:
         a first lift point; and
         a second lift point;
      a bottom substantially parallel to the top, wherein the bottom includes:
         a self-correcting ledge;
         anchor holes; and
         drainage holes;
      a front end that includes:
         a recess including a coupler;
         a hollow for receiving a splicer of another barrier; and
         a specialized geometry with tapers;
      a back end opposite the front end, wherein the back end includes:
         a hollow that holds a splicer;
      a coupler complementary to a coupler on a front end of another barrier such that the couplers engage when the other barrier is lowered next to the resin-based barrier; and
         a complementary specialized geometry that is complementary to the specialized geometry of the front end;
      a slot for a handle of the splicer to couple to the splicer such that a user may operate the splicer,
   a vertical shear web that runs between the top and the bottom, where the vertical shear web is substantially perpendicular to the top and the bottom;
   a longitudinal shear web that runs between the front end and the back end, where the longitudinal shear web is substantially parallel to the top and the bottom; and
   wherein:
      the body is filled with a high-density closed-cell foam; and
      the body around the couplers and the anchor holes is filled with ultra-high-density closed-cell foam.

* * * * *